Nov. 16, 1965 G. H. COGSDILL 3,217,570
DEBURRING TOOL
Original Filed April 25, 1961
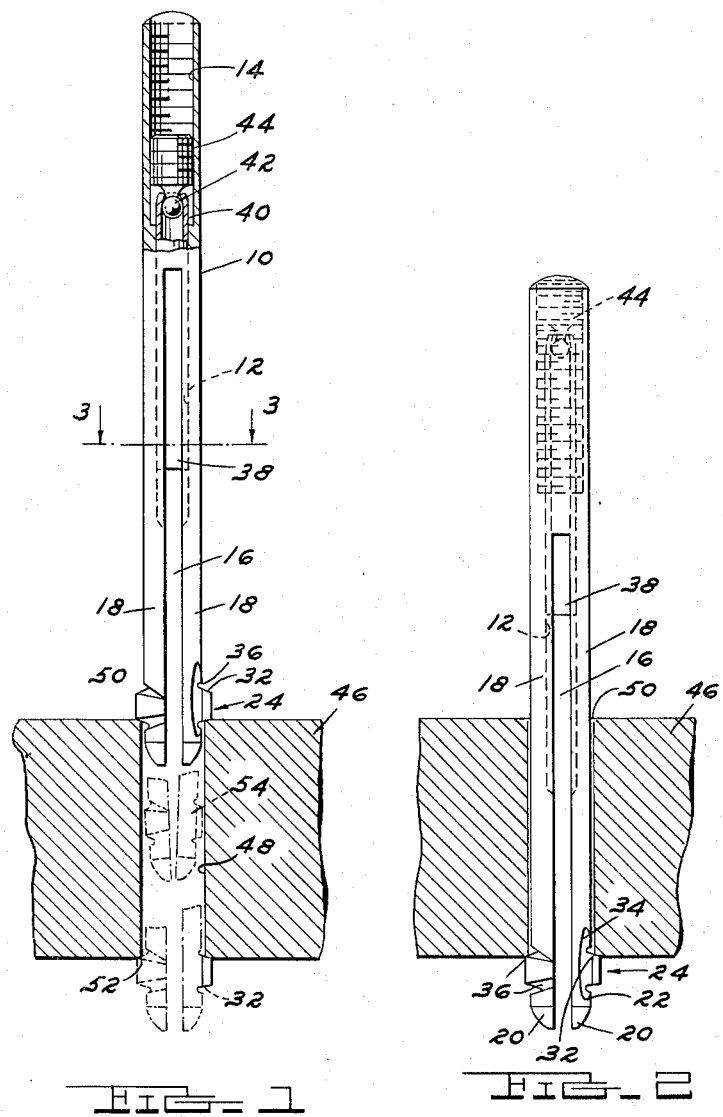
INVENTOR.
GLEN H. COGSDILL
BY
Barney, Kisselle, Raisch
& Choate
ATTORNEYS

United States Patent Office 3,217,570
Patented Nov. 16, 1965

3,217,570
DEBURRING TOOL
Glen H. Cogsdill, 48449 W. 9 Mile Road,
Northville, Mich.
Continuation of application Ser. No. 105,364, Apr. 25, 1961. This application Jan. 6, 1965, Ser. No. 424,887
30 Claims. (Cl. 77—73.5)

This application is a continuation of my prior, co-pending application Ser. No. 105,364, filed Apr. 25, 1961 and now abandoned.

This invention relates to a deburring tool; that is, a tool for removing the burr which usually forms around the edges of a hole drilled in a metal workpiece.

It is an object of this invention to provide a deburring tool that is of economical construction and which, at the same time, is constructed so as to deburr holes in a most efficient manner.

Another object of the invention resides in the provision of a deburring tool which incorporates readily adjustable means for adapting the tool for deburring holes drilled in metals which differ widely in hardness.

In the drawing:

FIG. 1 is an elevational view, partly in section, showing the deburring tool of this invention and the manner in which it operates to deburr the edges of opposite ends of a hole drilled through a workpiece.

FIG. 2 is a view similar to FIG. 1 and illustrating specifically the manner in which the tool of this invention is designed to deburr the edge around the lower end of a hole drilled through a workpiece.

FIG. 3 is a sectional view along the line 3—3 in FIG. 1.

Referring to the drawing, the deburring tool of the present invention comprises a cylindrical body 10 having a bore 12 extending into body 10 from one end thereof and internally threaded at said end as at 14. Body 10 is fashioned with a through slot 16 which extends to the opposite end of the body so as to form a pair of spring arms 18 on opposite sides of slot 16, the arms 18 being of generally semi-cylindrical shape. Slot 16 is relatively long in comparison with the unslotted portion of body 10. Bore 12 extends downwardly well into the slotted portion of the body.

The lower end of each arm 18 is formed with a rounded nose 20 which merges with a generally cylindrical pilot portion 22. Directly above the pilot portion 22, each arm 18 is formed with a cutting tool portion generally designated 24. Each cutting tool portion 24 is in the form of a radial enlargement on the body portion having an axially extending land 26 which has a radially abrupt leading edge 28 and which tapers gradually radially inwardly at its trailing edge 30. The upper and lower ends of lands 26 are inclined outwardly away from one another as illustrated such that at the leading edges 28 of land 26, oppositely inclined cutting edges 32 are formed. Preferably, the body portion 10 is undercut adjacent the leading edge 28 of each land as at 34 and also undercut adjacent the upper and lower edges of each land 26 as at 36 so that the cutting edges 32 are sharply defined.

As is shown in the drawings and particularly in FIG. 3, the cylindrical surface portion of each land, that is, the portion forwardly of the tapered trailing edge 30, extends forwardly of a plane normal to the plane of slot 16 and lying at the axis of the tool. Thus the cutting edges 32 may be resharpened repeatedly by grinding back the leading edge 28 without reducing the overall diameter of the tool at the cutting edges 32.

Within the bore 12, there is arranged a plunger 38 which has a close fit with the bore. The upper end of plunger 38 is fashioned with a sleeve portion 40 which receives a spherical extension 42 on the end of an adjusting screw 44. The upper end of sleeve 40 is crimped over spherical extension 42 to form a swivel connection between the plunger and screw 44.

The purpose of the axially adjustable plunger 38 is to vary the effective length of slot 16 and thus vary the tension required to flex the spring arms 18 and the cutting tool portions 24 toward one another. It will be appreciated that if the plunger 38 is retracted to a position at the upper end of slot 16, the two arms 18 can be flexed toward one another with substantially less pressure than is required when the plunger 38 is located adjacent the lower end of bore 12. This is important from the standpoint of regulating the deburring tension in relation to the type of material in which the holes to be deburred are drilled. For example, referring to FIG. 1, there is illustrated a metal plate 46 through which is drilled a hole 48. In many cases, it is required to remove the burr formed by the drilling operation around the edge of the hole as at 50 on the top side of the plate as well as the burr formed around the edge 52 of the hole at the bottom side of the plate. In using the deburring tool of the present invention and assuming that the tool is rotated by means of a suitable chuck in a clockwise direction, the nose and pilot portion of the tool is introduced into the hole 48 and the tool is driven downwardly. The inclined lower cutting edges 32 at the leading edges of the cutters 24 engage the edge of the hole and remove the burr therefrom. Continued axial downward pressure on the tool causes the two arms 18 to be cammed inwardly toward one another to the positions shown by the broken line showing at 54 in FIG. 1. The pressure required to flex the arms inwardly depends primarily on the effective length of slot 16. With the arms flexed inwardly as illustrated, the tool can be advanced through the hole 48 in plate 46. It will be observed that the width of slot 16 is greater than the difference in diameters between the shank of body 10 and the circle formed by the lands 26. When the cutting tools 24 emerge from the hole 48 at the bottom side of plate 22, an upward force is applied to the body of the tool so that the cutting edges 32 at the upper ends of lands 26 engage and deburr the edge 52 of the hole at the bottom side of the plate as the tool is retracted from the hole in the workpiece.

It will be appreciated that the force required to drive the tool through the workpiece and to retract the tool from below the bottom face of the workpiece will determine the degree of deburring performed. For example, if the pressure required to collapse the two arms 18 is very slight and the material being worked on is hardened steel, it may very well happen that the arms 18 will flex toward one another and permit the cutting tool 24 to pass into the hole 48 before the burr around the edge 50 of the hole is completely removed. On the other hand, it will be appreciated that if the material being worked upon is very soft, aluminum, for example, and the pressure required to flex the arms 18 toward one another is relatively high, then as the tool is driven down through the plate and then retracted up through the plate, a relatively large chamfer will be formed at the edges 50 and 52. Thus, the provision of a means for adjusting the tension required to flex the two arms 18 inwardly enables the deburring tool of this invention to be modified as desired in accordance with the type of material being worked and also the size of burr to be removed.

Another advantage of the present invention resides in the provision of the cutting tool portions 24 formed integrally with the spring arms 18 which in turn are formed integrally with the body portion 10 of the tool. With this type of construction as distinguished from deburring tools where the cutting edges are formed on blades rotatably or shiftably mounted on the shank of the tool, I have found that the problem of vibration of the cutting edges which is reflected in the finished surface of the workpiece is eliminated. In other words, with the tool of this invention, chatter marks which are so prevalent in connection with the use of deburring tools where the cutter is formed on a separate movable blade are substantially eliminated. A further advantage of the present tool over deburring tools wherein the cutting edges are formed on blade members or the like movably mounted within a slotted portion of the tool shank is that there are no crevices or the like in which chips are apt to lodge and render the tool inoperative. Experience has shown that with deburring tools employing blades movably mounted in a slot formed in the shank of the tool, chips and the like quite frequently lodge between the blade and the tool shank and cause the blade to stick in the slot. In the tool of this invention the spring arms 18 form integral extensions of the unslotted portion of the cylindrical body 10. "Integral" is used herein to indicate that the spring arms and the unslotted portion of the body are formed from one piece.

I claim:

1. A deburring tool comprising a cylindrical body having a through slot formed therein and extending axially to one end of the body to provide a pair of spaced apart spring arms which are adapted to flex toward and away from one another, said spring arms forming integral extensions of the unslotted portion of the body, said arms each having adjacent but spaced axially inwardly of the free end thereof a cutting tool comprising a radial enlargement formed with a cutting edge which extends generally transversely of the longitudinal axis of said slot, the opposed inner faces of said arms defining the opposite sides of said slot and the free ends of said spring arms extending beyond said cutting tools comprising a pilot portion of smaller radius than said cutting tools.

2. A deburring tool as called for in claim 1 wherein each cutting tool adjacent the free end of the arms is fashioned with a plurality of said cutting edges, one located at each of the axially opposite ends of said radial enlargement.

3. A deburring tool as called for in claim 1 wherein the width of said slot is greater than the difference in diameters between the cylindrical body and the circle formed by said radial enlargements.

4. A deburring tool as called for in claim 1 wherein the slotted portion of the body has an axial dimension substantially greater than the unslotted portion thereof.

5. A deburring tool as called for in claim 1 wherein each cutting tool is formed integrally with its respective arm.

6. A deburring tool as called for in claim 1 including means shiftable axially along the slotted portion of the body for varying the effective length of said slot.

7. A deburring tool as called for in claim 1 wherein the axial extent of each cutting tool is relatively small as compared with the axial extent of said arms.

8. A deburring tool as called for in claim 7 wherein the cutting tool on each arm is disposed relatively close to the free end of the arm in comparison to the axial distance between the cutting tool and the connection between said arms and the unslotted portion of the body.

9. A deburring tool comprising a cylindrical body having a through slot of uniform width extending axially to one end thereof to provide a pair of spaced apart spring arms which are integrally connected together at the other end of said body and which form integral extensions of the unslotted portion of the cylindrical body, said spring arms being adapted to flex toward and away from one another, each of said arms having a radially enlarged cutting tool thereon adjacent but spaced axialy from the free end thereof, said cutting tool having at axially opposite ends thereof a cutting edge extending generally transversely of the axis of the slot and means positioned within said slot and engaging each arm to resist flexing of the arms toward one another, said last mentioned means being shiftable axialy through that portion of the slot extending from the connected ends of the spring arms to a point adjacent and spaced axially from said radially enlarged cutting tools toward said connected ends of the spring arms.

10. A deburring tool comprising a cylindrical body having a through slot of uniform width at one portion thereof extending axially to one end of the body to provide a pair of spring arms which are adapted to flex toward and away from each other, each spring arm having a cutting tool thereon, the opposite end of said body having a bore therein extending to said slot and means in said bore projecting into said slot and terminating short of said one end of the body for varying the effective length of said slot.

11. A deburring tool as called for in claim 10 wherein said last mentioned means comprises a plunger and means for retaining said plunger for axial adjustment within said bore and slot.

12. A deburring tool as called for in claim 10 wherein said last mentioned means comprises a plunger, said bore being threaded and including means connected with said plunger and in threaded engagement with said threaded bore for advancing and retracting the plunger within said slot.

13. A deburring tool comprising a cylindrical body having a through slot of uniform width at one portion thereof extending axially to one end of the body to provide a pair of spring arms which are adapted to flex toward and away from each other, the opposite end of said body having a bore therein extending to said slot, a plunger in said bore projecting into said slot for varying the effective length of the slot and means for retaining the plunger for axial adjustment within said bore and slot, each cutting tool comprising a radial enlargement adjacent the free end of each arm, said radial enlargement having at axially opposite ends thereof a cutting edge extending transversely of the axis of the slot.

14. A deburring tool as called for in claim 13 wherein said plunger and the portion of said bore extending into said slot have generally uniform and corresponding diameters.

15. A deburring tool as called for in claim 13 wherein said axially opposite cutting edges are oppositely inclined, the cutting edge next adjacent the free end of the arm inclining in a direction outwardly and away from the free end of the arm.

16. A deburring tool as called for in claim 15 wherein said radial enlargement is formed with an axially extending, radially disposed face, the axially opposite ends of said radially disposed face of each cutting tool forming said cuitting edges.

17. A deburring tool as called for in claim 16 wherein said radially disposed faces are offset circumferentially from the edges of said arms defined by said slot.

18. A deburring tool as called for in claim 16 wherein the width of said slot is greater than the difference in diameters between said body portion and the circle defined by said radial enlargements.

19. A deburring tool comprising a cylindrical body having a through slot formed therein and extending axilly to one end of the body to provide a pair of spaced apart spring arms which are adapted to flex toward and away from one another, said spring arms forming integral extensions of the unslotted portion of the body, said arms each having adjacent but spaced axially inwardly of the free end thereof a cutting tool comprising a radial enlargement formed with a cutting edge which extends generally transversely of the longitudinal axis of said slot, each radial enlargement having its greatest radial dimension in a direction generally transversely of the plane of said slot and having a radial dimension at the edges of said slot no greater than the radial dimension of said body, the opposed inner faces of said arms defining the opposite sides of said slot and the free ends of said spring arms extending beyond said cutting tools comprising a pilot portion of smaller radius than said cutting tools.

20. A deburring tool as called for in claim 19, including means within said slot and adjustable in a direction axially of the slot to vary the effective length of the slot and thereby the tension at the free ends of said spring arms.

21. A deburring tool as called for in claim 19, including means within said slot and adjustable in a direction axially of the slot to vary the effective length of the slot and thereby the tension at the free ends of the said spring arms, said last-mentioned means and said slot having like transverse dimensions.

22. A deburring tool as called for in claim 19, including stop means within said slot and engaging opposite sides of the slot, said stop means and said slot having corresponding transverse dimensions to enable the stop to be adjusted in a direction axially of the slot while maintaining the radial dimension of said tool at said enlargements constant and means for maintaining said stop means in an axially adjusted position within said slot so as to vary the spring tension of spring arms at said cutting edges while maintaining the diameter of the tool constant at said cutting edges.

23. A tool as called for in claim 19, wherein the width of the slot is greater than the difference in diamaters of the tool at the greatest radial dimension of the enlargements and at the slotted portion of the cylindrical body adjacent said radial enlargements.

24. A deburring tool comprising a cylindrical body having a through slot formed therein and extending axially to one end of the body to provide a pair of spaced apart spring arms which are adapted to flex toward and away from one another, said spring arms forming integral extensions of the unslotted portion of the body, said arms each having adjacent the free ends thereof a cutting tool comprising a radial enlargement formed with a cutting edge which extends generally transversely of the longitudinal axis of said slot, each radial enlargement having its greatest radial dimension in a direction generally transversely of the plane of said slot and having a radial dimension at the edges of said slot no greater than the radial dimension of said body, the opposed inner faces of said arms defining the opposite sides of said slot, and means within said slot shiftable in a direction axially of the slot for varying the effective length thereof and thereby the tension of the spring arms at the free ends thereof.

25. A deburring tool as called for in claim 24, including stop means within said slot and engaging opposite sides of the slot, said stop means and said slot having coresponding transverse dimensions to enable the stop to be adjusted in a direction axially of the slot while maintaining the radial dimension of said tool at said enlargements constant and means for maintaining said stop means in an axially adjusted position within said slot so as to vary the spring tension of spring arms at said cutting edges while maintaining the diameter of the tool constant at said cutting edges.

26. A deburring tool comprising a cylindrical body having a through slot formed therein and extending axially to one end of the body to provide a pair of spaced apart spring arms which are adapted to flex toward and away from one another, said spring arms forming integral extensions of the unslotted portion of the body, said arms each having adjacent the free ends thereof a cutting tool comprising a radial enlargement formed with a cutting edge which extends generally transversely of the longitudinal axis of said slot, each radial enlargement having its greatest radial dimension in a direction generally transversely of the plane of said slot and having a radial dimension at the edges of said slot no greater than the radial dimension of said body, the opposed inner faces of said arms defining the opposite sides of said slot.

27. A deburring tool as called for in claim 26, wherein the free ends of said spring arms extend beyond said cutting tools and form a generally cylindrical pilot portion of smaller radius than said cutting tools.

28. A deburring tool as called for in claim 27, wherein each cutting edge is located circumferentially of the body forwardly of a plane normal to the plane of said slot and containing the central axis of the tool.

29. A deburriing tool as called for in claim 28, wherein the outer peripheral surface of each enlargement comprises a cylindrical portion adjacent the leading edge of the enlargement and coaxial with the body and of radially inwardly tapering surface adjacent the trailing edge of the enlargement.

30. A deburring tool as called for in claim 29, wherein said cylindrical surface portion extends from said leading edge of the enlargement to at least said plane normal to the plane of said slot.

No references cited.

WILLIAM W. DYER, JR., *Primary Examiner.*